A. J. TAYLOR.
MEASURING INSTRUMENT.
APPLICATION FILED JAN. 30, 1917.
1,244,390.
Patented Oct. 23, 1917.
2 SHEETS—SHEET 1.
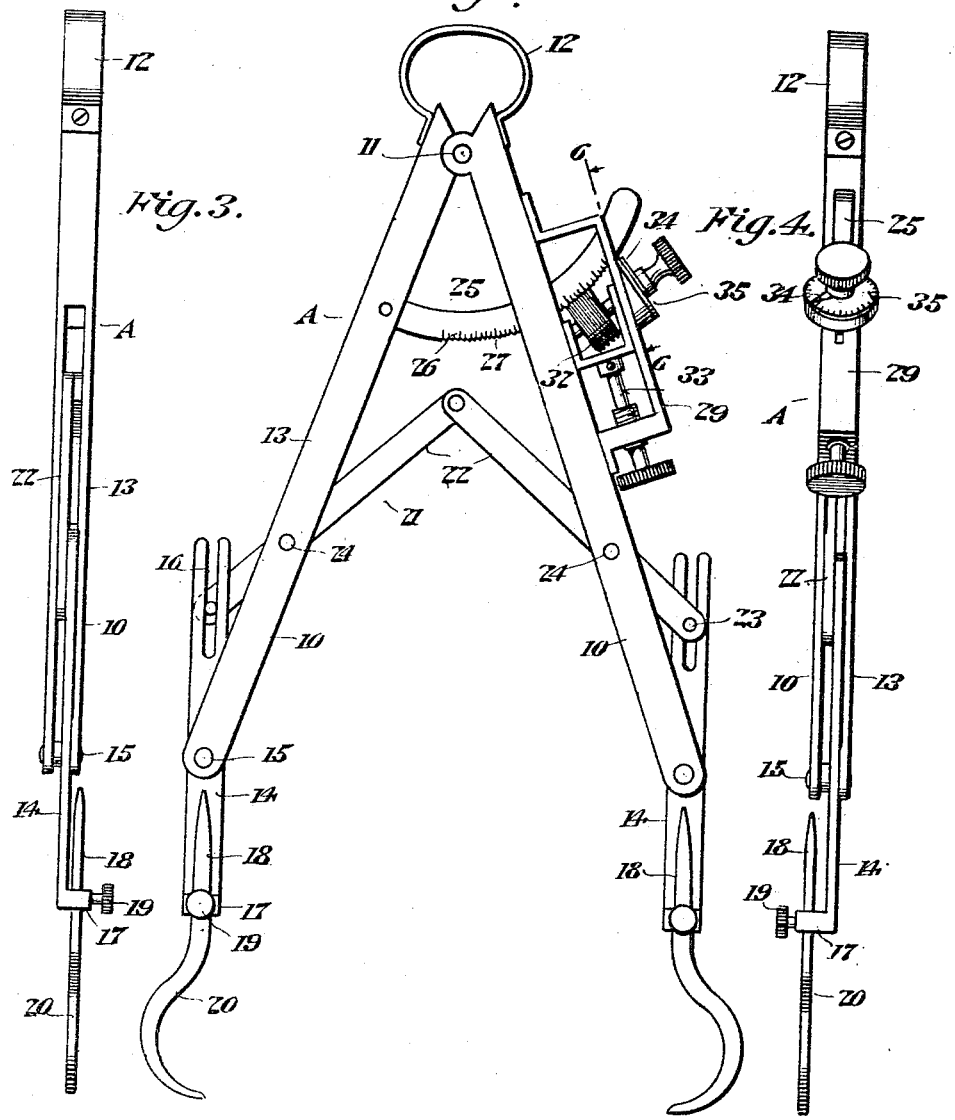
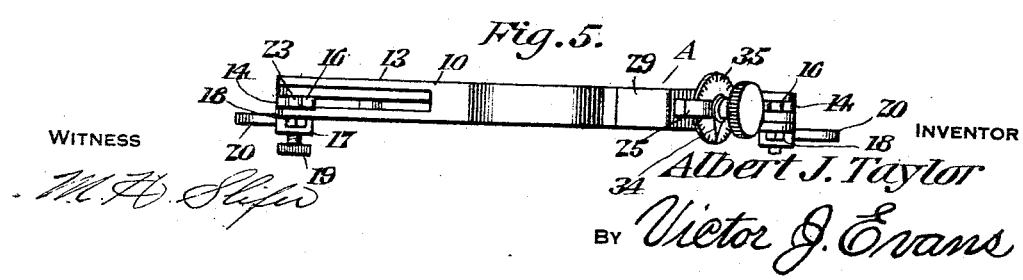
WITNESS
INVENTOR
Albert J. Taylor
BY Victor J. Evans
ATTORNEY A. J. TAYLOR.
MEASURING INSTRUMENT.
APPLICATION FILED JAN. 30, 1917.
1,244,390.
Patented Oct. 23, 1917.
2 SHEETS—SHEET 2.
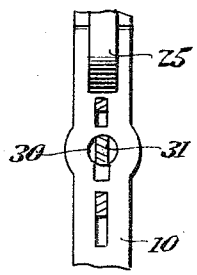
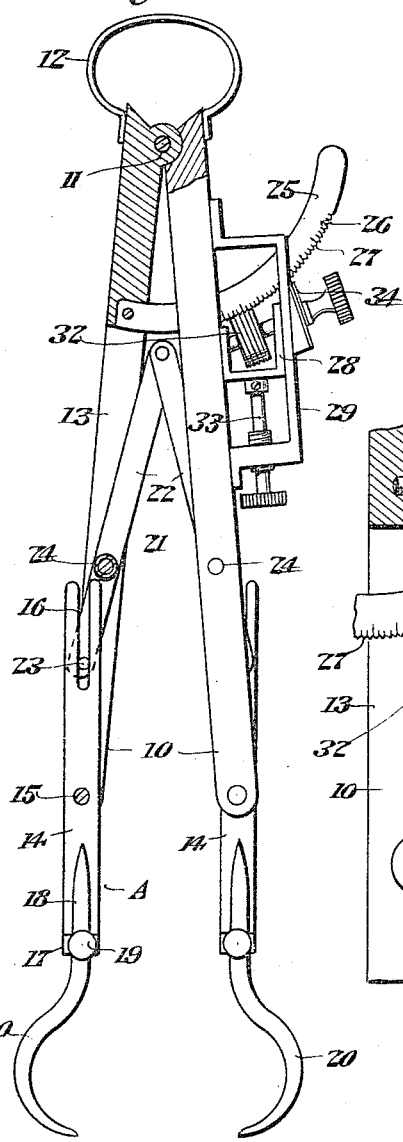
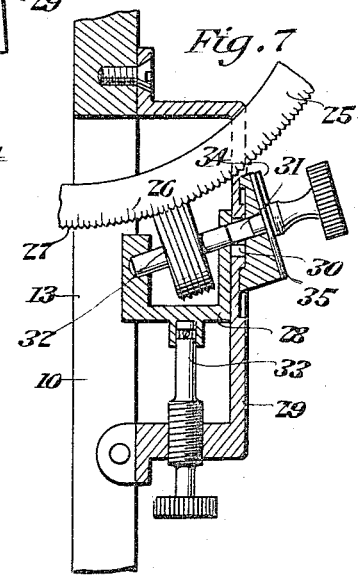
WITNESS
INVENTOR
Albert J. Taylor
BY Victor J. Evans
ATTORNEY

UNITED STATES PATENT OFFICE.

ALBERT J. TAYLOR, OF LAMASCO, TEXAS.

MEASURING INSTRUMENT.

1,244,390.　　　　　Specification of Letters Patent.　　Patented Oct. 23, 1917.

Application filed January 30, 1917. Serial No. 145,462.

*To all whom it may concern:*

Be it known that I, ALBERT J. TAYLOR, a citizen of the United States, residing at Lamasco, in the county of Fannin and State of Texas, have invented new and useful Improvements in Measuring Instruments, of which the following is a specification.

This invention relates to calipers, with the primary object of the invention being to provide a measuring instrument of this character which may be used as a micrometer and has the legs thereof so constructed and connected with a toggle that the calipers may be used for inside or outside work as the occasion requires.

Another object of the invention is to provide the calipers with adjusting mechanism which not only insure accurate adjustment of the instrument but is so constructed as to permit the calipers to be adjusted independently thereof if found desirable.

A further object of the invention is to so construct the legs of the calipers that the points may be adjustably connected therewith to render the calipers extensible.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications, within the scope of the claims may be resorted to when desired.

In the drawings:

Figure 1 is a view in elevation of a pair of calipers constructed in accordance with the invention, the legs thereof being shown spread apart.

Fig. 2 is a view in elevation of the calipers, parts being broken away and showing the legs in closed position.

Fig. 3 is a view in side elevation of Fig. 1.

Fig. 4 is a view looking at the reverse side of the calipers.

Fig. 5 is a top plan view of the calipers.

Fig. 6 is an enlarged detail section on the line 6—6 of Fig. 1.

Fig. 7 is a detail sectional view through the adjusting mechanism.

Like characters of reference denote corresponding parts throughout the several views in the drawings.

Referring now to the drawings in detail, the letter A designates a pair of calipers constructed in accordance with the invention and having a pair of legs 10 hingedly connected, as at 11, and provided with a spring 12 serving as a head, said legs being slotted longitudinally for the greater portion of their length to provide each leg with a pair of spaced and parallel sides 12.

Each leg 10 is provided with an extension 14 arranged between the sides of the leg and to extend beyond the free end of the leg with which said extension is pivotally connected between its ends, as at 15, said extension having formed therein for a portion of its length at its upper end a longitudinally extending slot 16 and is provided at its lower end with a laterally extending foot 17 through an opening in which passes the angular shank of a point 18, said point being adjustably and reversibly connected with the foot 17 by a binding screw 19 and having a curved portion 20 to permit the use of the point in measuring inside or outside diameters.

A toggle 21 has the pivotally connected links 22 thereof passed between the sides of the legs 10 and provided at their free ends with studs 23 received in the slots 16 in the extensions 14, said links 22 being pivotally connected between their ends, as at 24, with the legs 10 whereby the extensions 14 may be maintained in parallelism to enable the calipers to be used for inside, or outside work as the occasion requires.

An arcuate rack 25 which serves as a guide for the legs 10 is passed between the sides of one of said legs and has one end thereof secured to the other leg as shown, said rack being graduated, as at 26, upon one side for the greater portion of its length and provided upon its convex face with teeth 27 preferably sixty-four to the inch.

A yoke 28 is mounted to slide on a leg 10 of the calipers beneath the rack 25 and is retained on said leg by a bracket 29 also connected with the leg and having formed therein a key-hole slot 30 through which passes the reduced portion 31 of the shank of an adjusting screw 32 carried by the yoke 28 and held in engagement with the teeth on the rack 25 by a stem 33 swivelly connected with the yoke and adjustably mounted in the bracket 28, whereby when the reduced portion 31 of the shank of the adjusting screw is in registration with the reduced portion of the slot 30, the stem 33 may be adjusted within the bracket 29 to release the adjusting screw from engagement with the rack 25 to permit the calipers to be adjusted independently of said screw.

The shank of the adjusting screw has mounted thereon a point 34 to be moved over the surface of a dial 35 on the bracket 29, the graduations of the dial preferably corresponding in number to the number of teeth to the inch on the rack 25, so that when the pointer 34 has made one complete revolution, the leg 10 upon which the adjusting mechanism is mounted will have moved the distance of one inch and the reduced portion 32 of the shank again brought into registration with the reduced portion of the key-hole slot 30, thereby insuring the pointer being in proper position upon the dial when the stem 33 is operated to engage the adjusting screw with the rack 25.

When it is desired to use the calipers and the legs thereof are in the position shown in Fig. 2 in the drawings and the actuating screw is in engagement with the teeth upon the rack 25, the legs of the calipers may be spaced apart through the operation of the adjusting screw 32, the toggle 21 holding the extensions on the legs in parallelism to permit the calipers to be used for inside or outside work as the occasion requires.

The closing of the calipers may be accomplished by operating the adjusting screw for this purpose, or the reduced portion 32 of the shank of the operating screw brought into registration with the reduced portion of the key-hole slot 30, after which the stem 33 may be adjusted to release the adjusting screw from the rack 25 at which time the spring 12 will close the calipers.

By connecting the points 18 with the extensions on the legs of the calipers as above described, it will be seen that the points may be adjusted upon the legs or reversed according to the work being performed by the calipers, thus increasing the effectiveness of the calipers as measuring instruments.

From the foregoing description, taken in connection with the accompanying drawings, it is at once apparent that a pair of calipers has been provided which are so constructed that they may be used for inside or outside work and may be used as a micrometer if found desirable.

Having thus described the invention, what is claimed as new, is:

1. Calipers having a rack, an adjusting screw, a yoke carrying said adjusting screw and mounted to slide on one of the legs of the calipers, and means for sliding said yoke on the leg to engage said adjusting screw with the rack.

2. Calipers having a graduated and toothed rack, an adjusting screw, a yoke carrying said adjusting screw and mounted to slide on a leg of the calipers, a bracket connecting said yoke with the leg, and a stem on said yoke adjustable in said bracket to slide the yoke on said leg and engage the adjusting screw with the rack.

3. Calipers having a graduated and toothed rack, a yoke mounted to slide on one of the legs of the calipers, a bracket engaging said yoke with the leg and having a key-hole slot therein and a dial, an adjusting screw engaging said rack carried by the yoke and having a shank provided with a reduced portion received in said slot, and a stem adjustably mounted in said bracket and having swivel connection with the yoke.

In testimony whereof I affix my signature.

ALBERT J. TAYLOR.

Copies of this patent may be obtained for five cents each, by addressing the "Commissioner of Patents, Washington, D. C."